Feb. 5, 1929. C. E. LOEHR Re. 17,205

STAIR TREAD NOSING

Original Filed Sept. 19, 1925

INVENTOR
Charles Edward Loehr
BY
J. C. Rosenstiel
ATTORNEY

Reissued Feb. 5, 1929.

Re. 17,205

UNITED STATES PATENT OFFICE.

CHARLES EDWARD LOEHR, OF WOOSTER, OHIO, ASSIGNOR TO THE SAFETY STAIR TREAD COMPANY, OF WOOSTER, OHIO, A CORPORATION OF OHIO.

STAIR-TREAD NOSING.

Original No. 1,611,211, dated December 21, 1926, Serial No. 57,293, filed September 19, 1925. Application for reissue filed December 14, 1928. Serial No. 326,115.

This invention relates to nosing members for stair treads and consists of a nosing construction of improved form designed to have important advantages over nosing members as heretofore made and is, moreover, of simple form adapted to facilitate installation.

The improved nosing or edging member of the present invention is of the type particularly adapted for the protection of the edge of coverings, such as linoleum, composition, cork tile, rubber tile, and of similar materials when used on stairs, landings, floors, etc. where the edge would be subjected to destructive wear. It is, moreover, of the simple and well known form comprising, as an integrality, a substantially vertical edging or facing flange, preferably of curvilinear cross section having a horizontal securing flange projecting rearwardly therefrom to bear upon the floor or tread surface and provide means for securing the edging or nosing thereto. As heretofore made, the horizontal securing flanges of this desirable type of nosing have been of uniform thickness and, in consequence, it has been necessary to build up to covering rearward of the nosing or to cut away or rabbet the forward marginal edge surface of the stair tread or to similarly rabbet the undersurface of the floor covering so as to avoid the excessive wear incidental to the shoulder or high edge at the rear end of the securing flange and to eliminate the danger incident to the shoulder thus formed. In accordance with the present invention, the necessity for rabbeting the stair tread or floor covering is eliminated by a simple and improved form of securing flange which, in its cross section, has its under-surface normally in a horizontal plane and its upper surface inclined progressively to a rear edge that is relatively thin or of minute thickness whereby there is no appreciable shoulder produced. As a result, the improved nosing may be inexpensively installed by merely placing same upon the surface of the stair tread member without cutting and the covering may be laid thereon without danger of excessive wear.

The described and other features and advantages of the present improvements will be more fully understood by reference to the accompanying drawings wherein—

Figure 1:
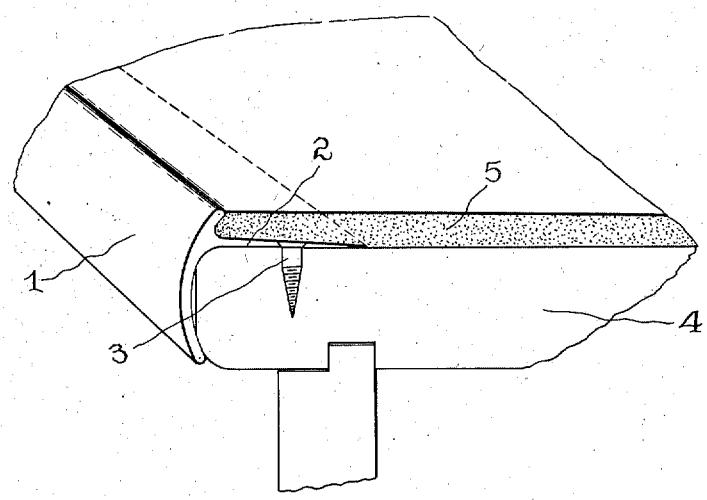
Fig. 1 is a perspective view illustrating the improved nosing of the present invention as installed.
Figure 2:
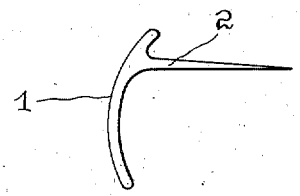
Fig. 2 is a vertical cross-sectional view of the nosing member.

In the improved embodiment of my invention, applied to a stair tread, as here shown, the nosing element or member is formed with a curved nosing or facing flange 1, having integrally formed therewith the horizontally extending securing flange 2, the latter being provided with suitable apertures for the reception of securing screws 3 for securing the nosing to the forward edge portions of stair treads 4 as indicated. The nosing element may be rolled or cast or extruded of suitable material such as yellow or white brass, adapted to effectively protect the stair covering indicated at 5 and of the character heretofore referred to. The upper portion of the nosing flange 1 extends or projects upwardly above the securing flange 2 a distance substantially corresponding to the depth or thickness of the covering 5 to be applied to the stair tread and the lower portion of the nosing flange 1 may desirably and as shown, project downwardly from the securing flange a distance corresponding to the thickness of the stair tread 4, thereby to present a unitary and attractive appearance.

The securing flange 2 is integrally formed to extend longitudinally of the nosing and in accordance with the present invention is of improved cross-sectional contour to facilitate and effect a substantial economy in installation. In accordance therewith, the securing flange at its forward edge, where joined to the nosing flange, is of maximum thickness and tapers therefrom rearwardly whereby the upper surface thereof will substantially converge with the upper surface of the stair tread. As shown, the under surface of the securing flange is positioned to be in a horizontal plane to have a firm bearing rest upon the upper marginal edge surface of the stair tread and the tapered form is produced by the progressive and rearward inclination of the upper surface to substantially a point or sharpened edge at the rearward extremity of the securing flange. As a result thereof, the stair covering of linoleum, composition, or other material may be laid of normal thickness overlying the securing flange 2 and extending forwardly to the nosing. The structure, accordingly, allows of installing the nosing without cutting of the tread or cutting or building up of the cover material to be used therewith and the rearward taper of the securing flange to a relatively thin sharpened edge, substantially eliminates the formation of a shoulder at its rearward edge. The elimination of the shoulder, as heretofore described, overcomes the excessive wear which would occur were the shoulder present and likewise, danger of tripping and the improved tapered securing flange further provides a desirable slight inclination to the tread surface at its forward edge conducive to safety in the use of the stairs.

It will be understood that the improvements are concerned more particularly with the special shape of the securing flange, which extends under the floor covering, and the upstanding portion of the nosing flange which abuts the edge of the floor covering, as distinguished from the depending portion of the nosing flange which faces the edge of a stair tread in usual manner.

It will also be understood that the relatively thin and sharp edge of the securing flange is not necessarily a cutting edge, but such an edge as may be made by extruding the metal through a die in accordance with well known practice.

Having described my invention, I claim:—

1. A nosing member for stair treads and the like comprising a nosing flange and a securing flange extending rearwardly therefrom, said securing flange having its underside surface in a horizontal plane and its upper surface inclined rearwardly to a rearward edge of minimum thickness whereby said upper surface will substantially converge with the surface of the stair tread.

2. A nosing member for stair treads and the like comprising a substantially vertically positioned nosing flange of convex curvature having a longitudinally extending and integral securing flange extending rearwardly therefrom, said securing flange having its underside surface in a horizontal plane and its upper surface inclined rearwardly to a rearward edge of minimum thickness and said securing flange being spaced from the upper edge of the nosing flange a distance corresponding to the thickness of the covering to be employed therewith, said securing flange being of such reduced thickness as to allow installation without beveling of the stair tread or of the covering employed therewith.

3. An edging member for floor coverings and the like, comprising an edging flange and a securing flange extending therefrom, said securing flange having its underside surface in the plane of the floor and its upper surface inclined from a maximum thickness at the edging flange to a minimum thickness at its free edge, whereby said upper surface will substantially converge with the surface of the floor.

4. An edging member for floor coverings and the like, comprising an upright edging flange having an integral securing flange extending laterally therefrom, said securing flange having its underside surface in the plane of the floor, and its upper surface inclined from a maximum thickness at the edging flange to a minimum thickness at its free edge and said securing flange being spaced from the upper edge of the edging flange a distance corresponding to the thickness of the covering to be employed therewith, said securing flange being of such reduced thickness as to allow installation without beveling either the floor or the covering employed therewith.

5. An edge strip for protecting an edge of floor covering and the like, including a securing flange adapted to be laid upon and secured to the floor beneath the covering, and an edge protecting flange anguarly protruding from the securing flange and having a side face adapted for lateral abutment against an edge of the covering, the lower surface of the securing flange being plane and adapted for abutment with the normally horizontal plane surface of the floor, and the upper surface of the securing flange being plane and intersecting the lower surface at a substantially sharp edge, and the protecting flange protruding upward from one side of the securing flange.

6. An edge strip for protecting an edge of floor covering and the like, including a securing flange adapted to be laid upon the floor, a plurality of apertures in the flange adapted to receive screws and the like for securing the flange to the floor beneath the covering, and an edge protecting flange angularly protruding from the securing flange and having a side face adapted for lateral abutment against an edge of the covering, the lower surface of the securing flange being plane and adapted for abutment with the normally horizontal plane surface of the floor, and the upper surface of the securing flange being plane and intersecting the lower surface at a substantially sharp edge, and the protecting flange protruding upward from one side of the securing flange.

7. An edge strip having an angle cross section for protecting an edge of floor covering and the like, including a tapered securing flange adapted to be laid upon and secured to the floor beneath the covering, and an edge protecting flange angularly protruding from the base of the tapered securing flange and having a side face adapted for lateral abutment against an edge of the covering, the lower surface of the securing flange being plane and adapted for abutment with the normally horizontal plane surface of the floor, and the upper surface of the securing flange being plane and intersecting the lower surface at a substantially sharp edge, and the protecting flange protruding upward from one side of the securing flange.

CHARLES EDWARD LOEHR.